United States Patent
Xiao et al.

(10) Patent No.: US 8,015,015 B2
(45) Date of Patent: Sep. 6, 2011

(54) VOICE CONTROL SYSTEM AND METHOD FOR OPERATING DIGITAL PHOTO FRAME

(75) Inventors: Yong-Hui Xiao, Shenzhen (CN); Lai Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/327,622

(22) Filed: Dec. 3, 2008

(65) Prior Publication Data

US 2009/0326956 A1 Dec. 31, 2009

(30) Foreign Application Priority Data

Jun. 27, 2008 (CN) .......................... 2008 1 0302414

(51) Int. Cl.
*G10L 21/00* (2006.01)
(52) U.S. Cl. ....................................................... 704/275
(58) Field of Classification Search .................. 704/275
See application file for complete search history.

(56) References Cited

U.S. PATENT DOCUMENTS

| | | | | |
|---|---|---|---|---|
| 6,031,526 A | * | 2/2000 | Shipp | 715/201 |
| 7,262,763 B2 | * | 8/2007 | Kinjo | 345/173 |
| 7,606,442 B2 | * | 10/2009 | Pilu | 382/298 |
| 7,796,190 B2 | * | 9/2010 | Basso et al. | 348/445 |
| 7,894,639 B2 | * | 2/2011 | Grim et al. | 382/118 |

* cited by examiner

*Primary Examiner* — Susan McFadden
(74) *Attorney, Agent, or Firm* — Altis Law Group, Inc.

(57) ABSTRACT

A voice control system includes an acoustic sensor, and a digital photo frame. The acoustic sensor is configured to receive a voice signal, and transform the voice signal to an electronic signal. The digital photo frame includes a transforming module, an instruction module, and a comparing module. The transforming module receives the electronic signal sent from the acoustic sensor and transforms the electronic signal to a transformed electronic code. The instruction module defines a plurality of predetermined electronic codes for performing predetermined functions of the digital photo frame. The comparing module compares the transformed electronic code with the predetermined electronic codes. If the transformed electronic code matches one of the predetermined electronic codes, the digital photo frame performs a function of the predetermined functions associated with the matched predetermined electronic code. A method for operating the digital photo frame is also provided.

7 Claims, 2 Drawing Sheets

VOICE CONTROL SYSTEM AND METHOD FOR OPERATING DIGITAL PHOTO FRAME

BACKGROUND

1. Technical Field

The present disclosure relates to a voice control system and a method for operating the digital photo frame.

2. Description of the Related Art

A typical digital photo frame (DPF) can be used to store and display digital image files. Usually, an operator must manually switch on or off the DPF, which is inconvenient.

Therefore, there is room for improvement within the art.

DETAILED DESCRIPTION OF THE EMBODIMENTS

Figure 1:
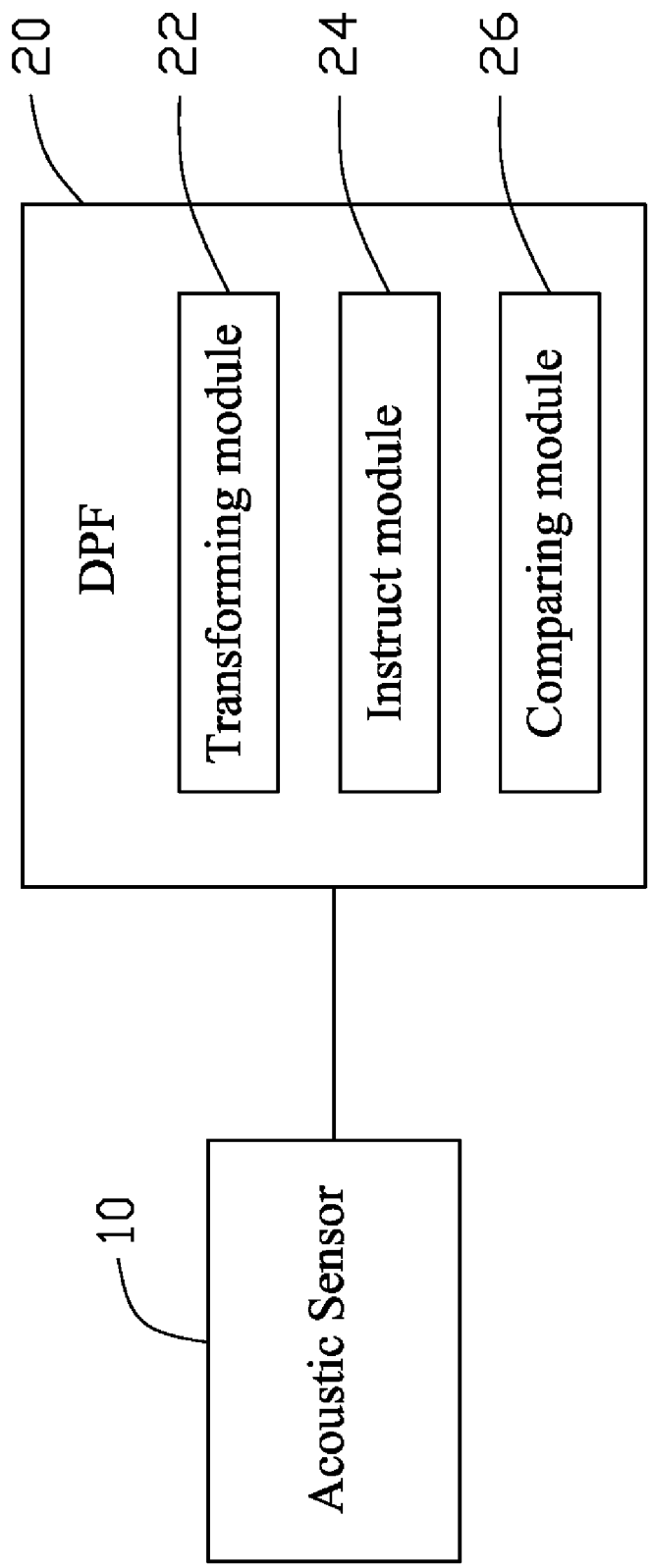
FIG. 1 is a block diagram of an embodiment of a voice control system.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Referring to FIG. 1, an embodiment of a voice control system includes an acoustic sensor 10 and a digital photo frame (DPF) 20.

The acoustic sensor 10 is electronically connected to the DPF 20, and is configured to transform a voice signal to an electronic signal and send the electronic signal to the DPF 20. The acoustic sensor 10 can be installed in, on, or nearby a chassis of the DPF 20.

The DPF 20 can be used to store and display digital image files, and includes a transforming module 22, an instruction module 24, and a comparing module 26. The transforming module 22 is configured to transform the electronic signal to a transformed electronic code. The instruction module 24 defines a plurality of predetermined electronic codes for performing functions of the DPF 20, for example, power on, power off, display picture, and so on. The predetermined electronic codes of the instruction module 24 can be edited. The comparing module 26 is configured to compare the transformed electronic code with each of the predetermined electronic codes to find a match.

Figure 2:
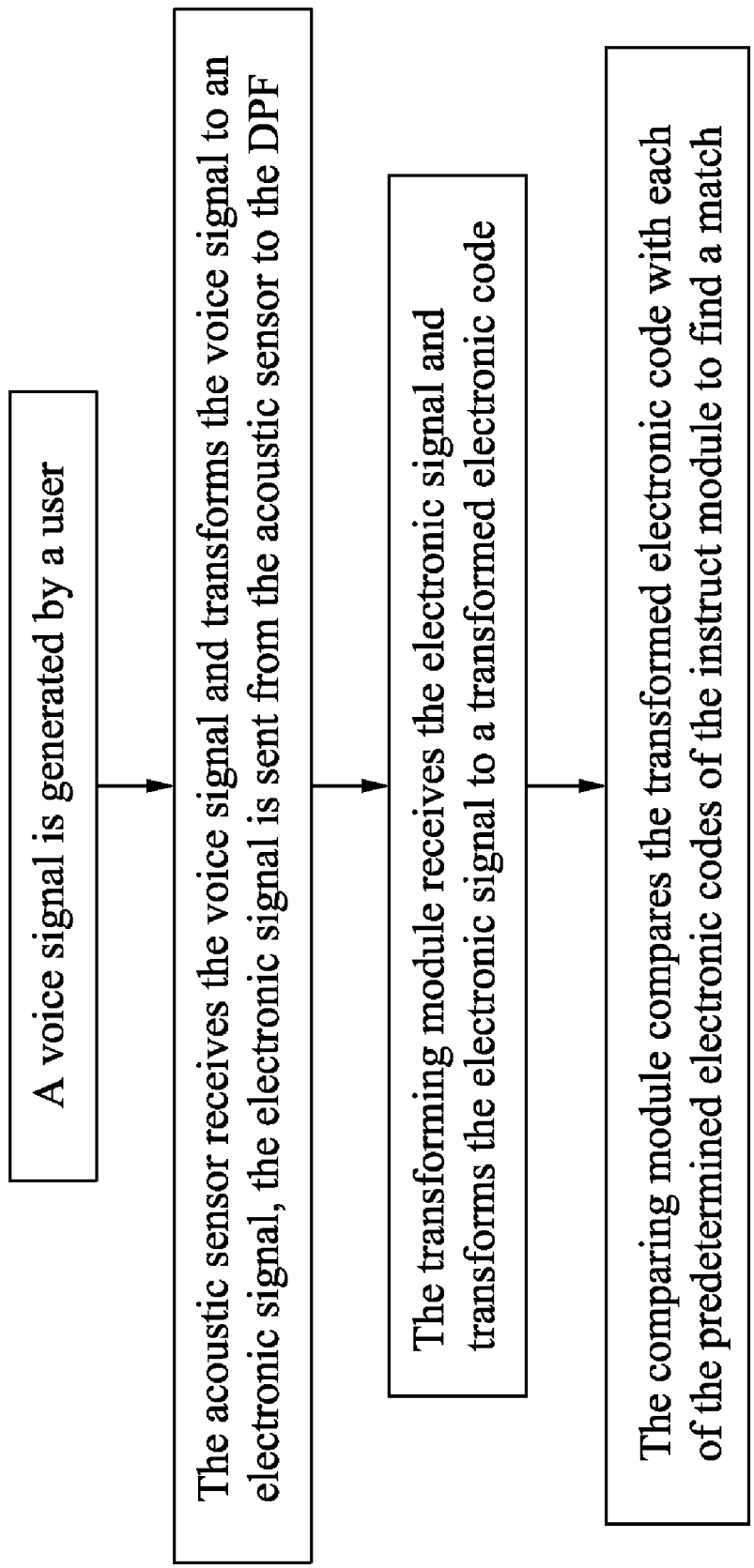
FIG. 2 is a flow chart illustrating an embodiment of a method using the system of FIG. 1.

Referring also to FIG. 2, a method of operating the DPF 20 is shown. Depending on the embodiment, certain of the steps described below may be removed, others may be added, and the sequence of steps may be altered.

A voice signal is generated by a user. The acoustic sensor 10 receives the voice signal and transforms the voice signal to an electronic signal. The electronic signal is sent from the acoustic sensor 10 to the DPF 20. The transforming module 22 receives the electronic signal and transforms the electronic signal to a transformed electronic code. The comparing module 26 compares the transformed electronic code with each of the predetermined electronic codes of the instruction module 26. If there is a match, the function associated with the matched predetermined electronic code is performed by the DPF 20. If there is no match, no function of the DPF 20 would be performed, or no matched function would be displayed on an image of the DPF 20.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A voice control system, comprising:
an acoustic sensor configured to receive a voice signal, and transform the voice signal to an electronic signal; and
a digital photo frame comprising a transforming module, an instruction module, and a comparing module, wherein the transforming module receives the electronic signal sent from the acoustic sensor and transforms the electronic signal to a transformed electronic code; the instruction module defines a plurality of predetermined electronic codes for performing predetermined functions of the digital photo frame; the comparing module compares the transformed electronic code with the predetermined electronic codes; if the transformed electronic code matches one of the predetermined electronic codes, the digital photo frame performs a function of the predetermined functions associated with the matched predetermined electronic code.

2. The voice control system of claim 1, wherein the predetermined electronic codes and the predetermined functions of the instruction module are editable.

3. The voice control system of claim 1, wherein the predetermined functions comprises a switch on function and a switch off function.

4. The voice control system of claim 1, wherein the digital photo frame displays an image indicating there is no matched function if the transformed electronic code does not match the predetermined electronic codes.

5. The voice control system of claim 1, wherein the digital photo frame does not perform any of the predetermined functions if the transformed electronic code does not match the predetermined electronic codes.

6. A method for operating a digital photo frame, comprising:
receiving voice signals;
transforming a voice signals to an electronic signal;
sending the electronic signal to the digital photo frame;
transforming the electronic signal to a transformed electronic code;
comparing the transformed electronic code with predetermined electronic codes of the digital photo frame; and
performing a function of the digital photo frame associated with the matched predetermined electronic code if the transformed electronic code matches one of the predetermined electronic codes.

7. The method of claim 6, further comprising displaying no matched function if the transformed electronic code does not match with one of the predetermined electronic codes.

* * * * *